United States Patent [19]

Ficalora

[11] Patent Number: 5,456,112
[45] Date of Patent: Oct. 10, 1995

[54] HIGH ACCURACY LASER ACCELEROMETER

[75] Inventor: Jospeh P. Ficalora, Oak Ridge, N.J.

[73] Assignee: AlliedSignal Inc., Morristownship, N.J.

[21] Appl. No.: 171,597

[22] Filed: Dec. 21, 1993

[51] Int. Cl.$^6$ .............................. G01P 15/08; G01B 9/02
[52] U.S. Cl. ................... 73/514.26; 73/510; 73/511; 73/514.19; 356/349; 356/350; 356/352; 372/92
[58] Field of Search .................... 356/349, 350, 356/351, 352; 73/514, 517 R, 516 R, 518, 517 B, 510, 511; 372/92, 94, 55, 93, 37

[56] References Cited

U.S. PATENT DOCUMENTS

| | | | |
|---|---|---|---|
| 4,233,847 | 11/1980 | Walker | 73/517 R |
| 4,422,331 | 12/1983 | Walker | 73/517 B |
| 4,428,234 | 1/1984 | Walker | 73/517 R |
| 4,429,573 | 2/1984 | Walker | 73/510 |
| 4,841,774 | 6/1989 | Hall | 73/517 R |
| 4,918,987 | 4/1990 | Vescial et al. | 73/517 B |

*Primary Examiner*—Georgia Y. Epps
*Attorney, Agent, or Firm*—Donald B. Paschburg; Howard G. Massung

[57] ABSTRACT

A high accuracy laser accelerometer has a differential pathlength element having an outer annulus and a combined acceleration sensing proof mass with a laser mirror, a closed cavity including a cathode, anode and a movable pathlength control mirror, a lens prismatic readout, a photodetector and associated electronics. When the laser accelerometer is subjected to linear acceleration, the acceleration sensing proof mass moves relative to the outer annulus of the differential pathlength element causing a differential pathlength change in the cavity which is readily detected by the photodetector.

12 Claims, 4 Drawing Sheets

HIGH ACCURACY LASER ACCELEROMETER

BACKGROUND OF THE INVENTION

1. Field of the Invention

The present invention relates to accelerometers and more particularly to multi-mode linear lasers employing proper mode sizing to a proof-mass-mirror within an accelerometer.

2. Description of the Prior Art

The sensitivity of a basic accelerometer is limited by the proof mass relationship to the force to be sensed; i.e. $F=ma$ or $a=F/m$. The smallest acceleration that can be sensed is dependent on the proof mass, m and the (restoring) forces acting upon it. It is clear that for a fixed proof mass m, smaller accelerations to be sensed require either: (1) smaller forces or (2) greater resolution of proof mass displacement. If the proof mass is suspended by a simple spring then the displacement is related to the forces acting upon it by $F=-kx$. Smaller spring force creates a problem in dynamic range and or size of the spring. Greater resolution can be obtained with the use of a resonant cavity or active laser.

Also, the use of digital computers in advanced navigation and guidance systems to calculate velocity and position require an accelerometer whose output is inherently digital.

It is an object of the present invention to obtain increased resolution of the motion of the proof mass in a fashion that produces digital counts for modem inertial navigation systems.

SUMMARY OF THE INVENTION

A multi-mode linear laser typically may have several modes lasing at once, each with a different transverse spatial geometry. The spatial dimensions are dependent upon the resonator's length and mirror radii of curvature. By employing proper mode-sizing to a combined proof-mass-mirror, it enables differential pathlength to occur proportional to acceleration. The differential pathlength causes a frequency difference between lasing modes which is readily counted.

The high accuracy laser accelerometer of the present invention includes an acceleration sensing proof mass combined with a laser mirror, a laser or optically resonant cavity including a closed cavity, cathode, anode and a movable pathlength control mirror, a lens/prismatic readout to combine the two optical beams, a photodetector to convert the fringes to a sinusoidal electrical signal and associated electronics to convert the sinusoidal output to TTL logic pulses.

DETAILED DESCRIPTION OF THE INVENTION

Figure 4:
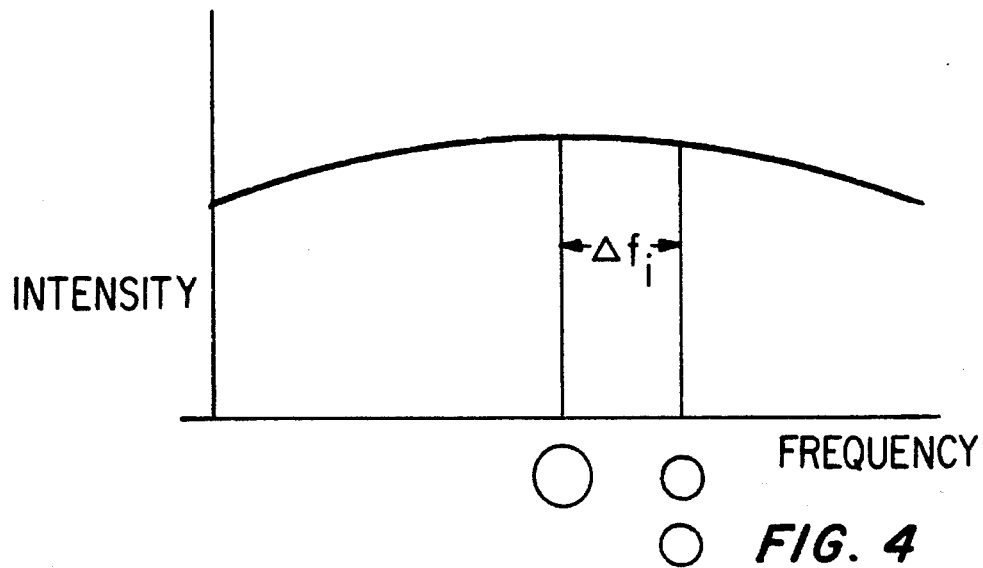
FIG. 4 illustrates a frequency difference without acceleration present.

Any single mode linear laser is an oscillator with a single resonant frequency. A multi-mode linear laser generally has at least two resonant frequencies, and sometimes more than two. In the approach of the present invention, a gas He-Ne laser is utilized, although the present invention is not limited to this particular laser. The He-Ne laser is arranged to have a TEM 0,0 mode and either a TEM 1,1 (donut-shaped) mode or other higher order mode (TEM 1,0 or TEM 0,1) oscillating at the same time. As shown in FIG. 4, these two oscillating modes have an initial frequency difference ($\Delta f_i$) or beat note based upon the pathlength and radii of curvature of the two mirrors.

Figure 1:
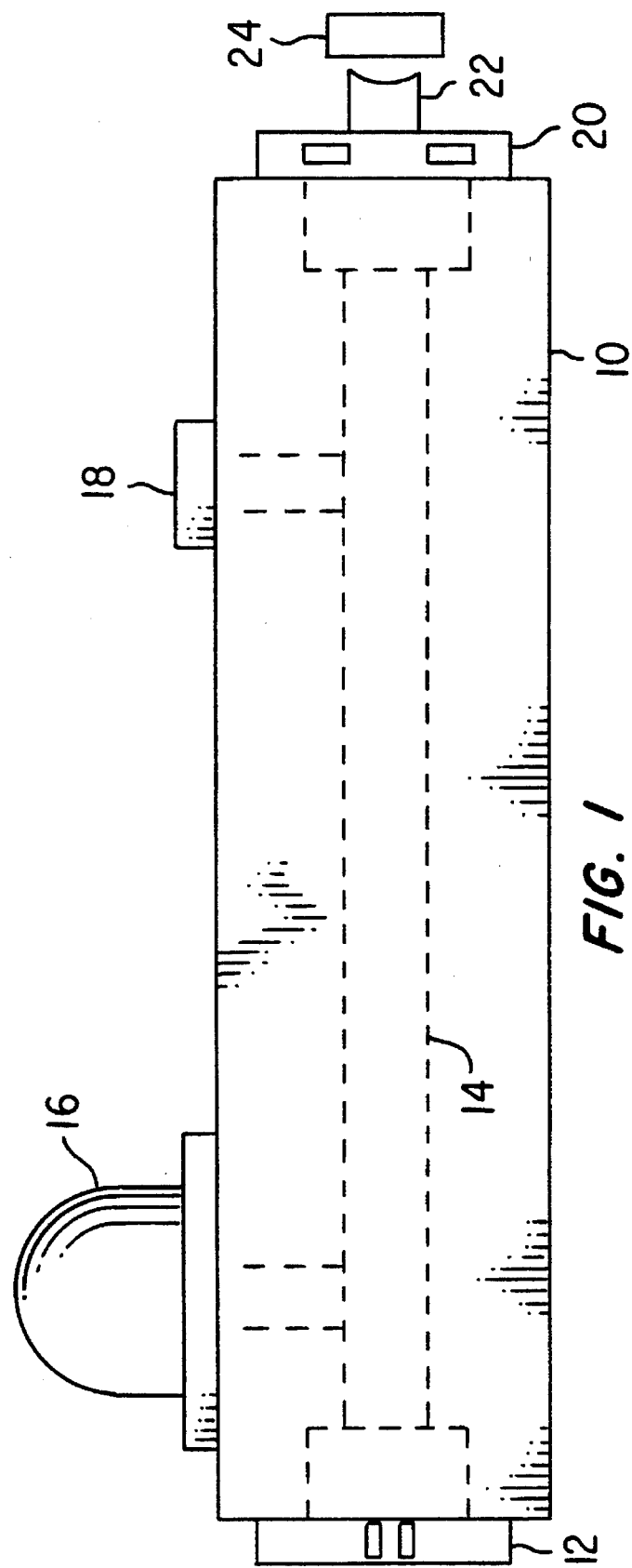
FIG. 1 illustrates a side view of one embodiment of the present invention.

FIG. 1 illustrates laser accelerometer 10 having proof mass/laser mirror 12, a laser or optically resonant cavity including closed cavity 14, cathode 16, anode 18 and movable pathlength control mirror 20. Lens/prismatic readout 22 combines two optical beams located in the closed cavity and photodetector 24 converts the fringes to a sinusoidal electrical signal. Associated electronics (not shown) are utilized to convert the sinusoidal output to TTL logic pulses.

Figure 2:
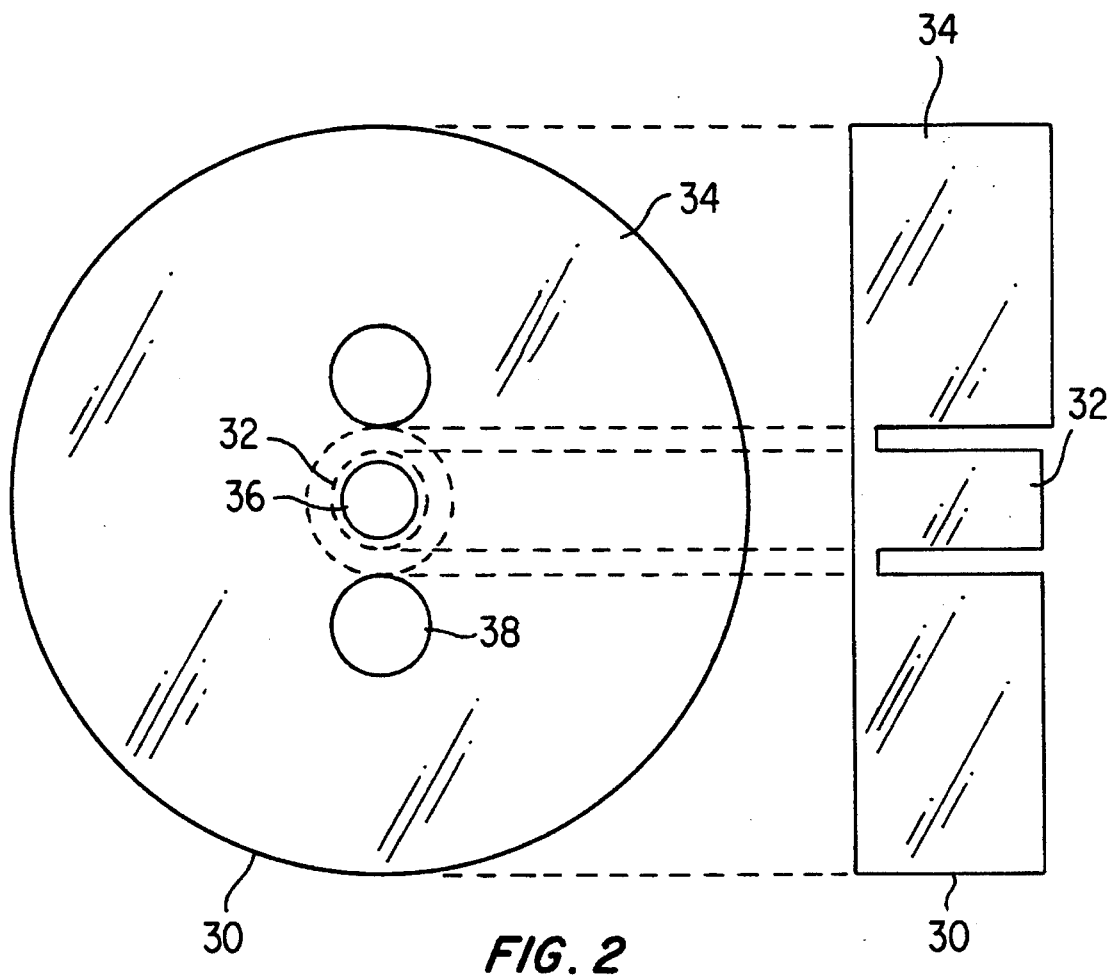
FIG. 2 illustrates a differential pathlength element showing proof mass and outer annulus.
Figure 5:
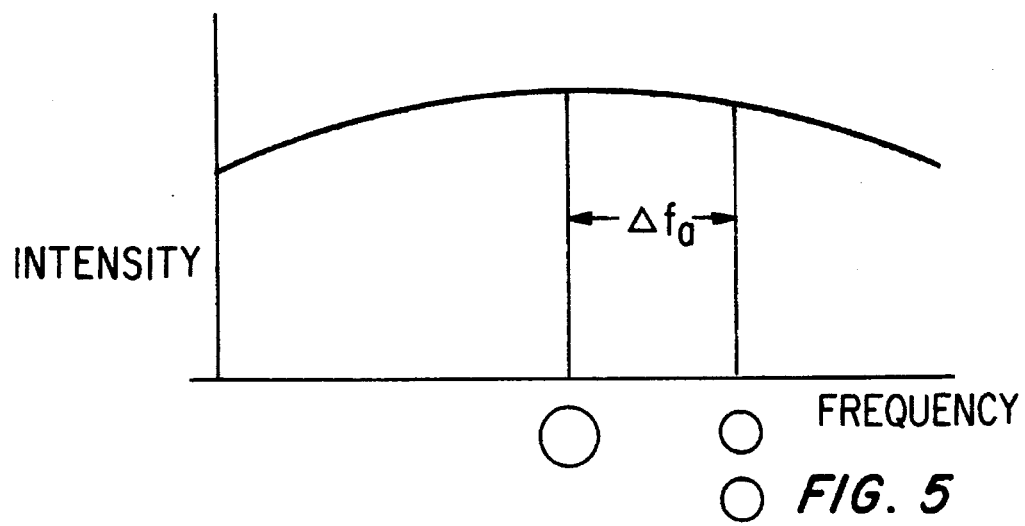
FIG. 5 illustrates a frequency difference with acceleration present.

FIG. 2 illustrates differential pathlength element 30 showing proof mass 32 and outer annulus 34. The sensing mirror of the present invention is designed to have center proof mass 32 suspended in a diaphragm fashion. The diameter of the post of this mirror is chosen to be close to the diameter of the TEM 0,0 (fundamental) mode 36. When subjected to linear acceleration, the central post 32 will move relative to the outer annulus 34. The fundamental mode 36 will experience slightly more pathlength change than the other mode (donut-shaped mode 38 shown in FIG. 2), due to the differential motion of the center of the sensing mirror versus the outer region. The differential pathlength is a result of TEM 0,0 mode 36 being located spatially on proof mass 32 of differential pathlength mirror 30, while the other TEM mode 38 is located spatially on the annulus 34 of mirror 30. As shown in FIG. 5, this differential pathlength change between the lasing modes will result in an initial frequency difference change ($\Delta f_a$) between the modes, which is readily detected when both outputs are focused onto a single photodiode 24 of FIG. 1. This change in $\Delta f_i$ ($\Delta f_a$) can be counted and summed by associated electronics (not shown) to determine the change in acceleration experienced by the laser accelerometer.

Figure 3:
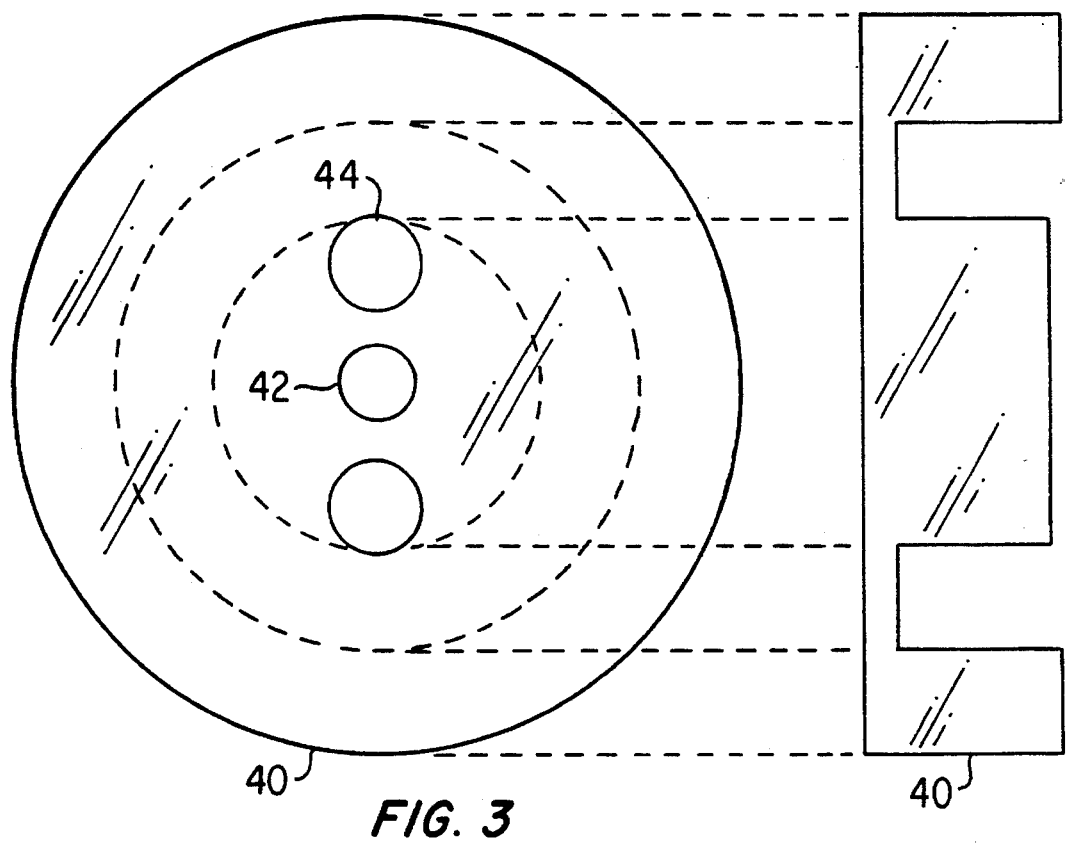
FIG. 3 illustrates a common pathlength controller.

FIG. 3 illustrates common pathlength controller 40 and TEM 0,0 mode 42 with donut-shaped mode 44. As described above, FIG. 4 illustrates an initial frequency difference ($\Delta f_i$) between TEM 0,0 mode and TEM 1,1 mode or other higher order mode (TEM 1,0 or TEM 0,1). The change in initial frequency difference ($\Delta f_a$) between TEM 0,0 mode and TEM 1,1 mode or other higher order mode (TEM 1,0 or TEM 0,1) is illustrated in FIG. 5. This change in initial frequency difference ($\Delta f_a$) occurs when acceleration is present.

Calculations have been made showing feasibility of the approach. Mode diameter (spot-size) analysis have shown that for a radius of curvature of 40 meters per mirror, at a wavelength of 3.39 μm, the spot diameter is about 0.097" for a rayleigh length parameter of 1.413 (zo). The length of the laser would be 10 centimeters and the initial frequency difference would be 34 Mhz. Other values of wavelength, frequency spacing and spot diameter are also possible.

It is noted that with silicon micro machining techniques, this approach has applicability to a smaller, less expensive, solid-state laser accelerometer, where the laser, beam size, proof mass, and mirrors are 1/10 the size of the above high accuracy accelerometer. This smaller approach would yield a higher accuracy device than other small accelerometers employing simple silicon proof masses and hinges requiring V-F converters to obtain digital pulses.

It is not intended that this invention be limited to the hardware arrangement, or operational procedures shown disclosed. This invention includes all of the alterations and variations thereto as encompassed within the scope of the claims as follows.

I claim:

1. A high accuracy laser accelerometer comprising:

a differential pathlength element;

a cavity connected to said differential pathlength element;

a lens/prismatic readout connected to said cavity;

a photodetector to monitor said lens/prismatic readout and to provide a sinusoidal output; and, associated electronics to convert said sinusoidal output to logic pulses.

2. A high accuracy laser accelerometer as claimed in claim 1 wherein said differential pathlength element comprises:

an acceleration sensing proof mass; and, an outer annulus surrounding said acceleration sensing proof mass.

3. A high accuracy laser accelerometer as claimed in claim 2 wherein said acceleration sensing proof mass is suspended in a diaphragm fashion.

4. A high accuracy laser accelerometer as claimed in claim 3 wherein said acceleration sensing proof mass means is combined with a laser mirror.

5. A high accuracy laser accelerometer as claimed in claim 4 wherein said acceleration sensing proof mass has a diameter slightly larger than diameter of a TEM 0,0 fundamental mode.

6. A high accuracy laser accelerometer as claimed in claim 4 wherein when subjected to linear acceleration, said acceleration sensing proof mass moves relative to said outer annulus causing a differential pathlength change in said cavity which is readily detected by said photodetector.

7. A high accuracy laser accelerometer as claimed in claim 1 wherein said lens/prismatic readout combines two optical beams located in said optically resonant cavity.

8. A high accuracy laser accelerometer as claimed in claim 1 wherein said photodetector converts fringes to said sinusoidal output.

9. A high accuracy laser accelerometer as claimed in claim 1 wherein said cavity comprises:

a closed cavity;

a cathode connected to said closed cavity;

an anode connected to said closed cavity; and a movable pathlength control mirror connected to said closed cavity.

10. A high accuracy laser accelerometer as claimed in claim 9 wherein said closed cavity comprises:

a laser cavity.

11. A high accuracy laser accelerometer as claimed in claim 9 wherein said closed cavity comprises:

an optically resonant cavity.

12. A high accuracy laser accelerometer comprising:

a differential pathlength element comprising an acceleration sensing proof mass and an outer annulus surrounding said acceleration sensing proof mass;

a cavity connected to said differential pathlength element;

a lens/prismatic readout connected to said cavity;

a photodetector to monitor said lens/prismatic readout and to provide a sinusoidal output; and, associated electronics to convert said sinusoidal output to logic pulses, wherein when subjected to linear acceleration, said acceleration sensing proof mass moves relative to said outer annulus causing a differential pathlength change in said cavity which is readily detected by said photodetector.

* * * * *